United States Patent
Otsuka et al.

(10) Patent No.: US 11,174,894 B2
(45) Date of Patent: Nov. 16, 2021

(54) FLUID PUMP FOR A MOTOR VEHICLE

(71) Applicant: PIERBURG PUMP TECHNOLOGY GMBH, Neuss (DE)

(72) Inventors: Noriyuki Otsuka, Neuss (DE);
Michael Rombach, Neuss (DE);
Andreas Wulf, Duesseldorf (DE);
Marco Limbach, Niederkassel (DE);
Tobias Muench, Neuss (DE); Antonio Dipace, Duesseldorf (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 17/059,270

(22) PCT Filed: Jun. 1, 2018

(86) PCT No.: PCT/EP2018/064478
§ 371 (c)(1),
(2) Date: Nov. 27, 2020

(87) PCT Pub. No.: WO2019/228644
PCT Pub. Date: Dec. 5, 2019

(65) Prior Publication Data
US 2021/0207651 A1 Jul. 8, 2021

(51) Int. Cl.
*F16C 25/08* (2006.01)
*F16C 27/06* (2006.01)
(Continued)

(52) U.S. Cl.
CPC ............ *F16C 19/06* (2013.01); *F16C 35/077* (2013.01); *F16C 25/083* (2013.01); *F16C 27/066* (2013.01);
(Continued)

(58) Field of Classification Search
CPC ...... F16C 19/06; F16C 19/546; F16C 19/547; F16C 19/548; F16C 19/55; F16C 25/083;
(Continued)

(56) References Cited

U.S. PATENT DOCUMENTS 4,927,326 A 5/1990 von Pragenau
7,594,760 B2 * 9/2009 Goss .................... F16C 35/061
384/500

FOREIGN PATENT DOCUMENTS

DE 19818633 A1 * 11/1999 ............ F16C 25/083
JP S 60-154622 U 10/1985
(Continued)

*Primary Examiner* — Phillip A Johnson
(74) *Attorney, Agent, or Firm* — Norman B. Thot (57) ABSTRACT

A fluid pump for a motor vehicle includes a pump wheel which is co-rotatably connected with a driving device via a rotor shaft, and a shaft bearing system for the rotor shaft. The shaft bearing system includes a bearing receptacle having a support flange, and a first and a second ball bearing. The first and the second ball bearing are each fixed to a radial outside of the rotor shaft, are each axially shiftable within the static bearing receptacle, and are positioned at opposite axial sides of the support flange. An outer race of the first ball bearing contacts the support flange. An outer race of the second ball bearing is axially preloaded away from the support flange via a preload spring. The first and the second ball bearing are each radially supported within the static bearing receptacle only by an elastic support ring which radially surrounds the outer races.

16 Claims, 4 Drawing Sheets

(51) Int. Cl.
*F16C 19/06* (2006.01)
*F16C 35/077* (2006.01)
*F16C 33/58* (2006.01)

(52) U.S. Cl.
CPC ........ *F16C 33/586* (2013.01); *F16C 2360/00* (2013.01)

(58) Field of Classification Search
CPC .. F16C 27/066; F16C 33/586; F16C 33/7886; F16C 35/077; F16C 2229/00; F16C 2360/00; F16C 2360/44; F16C 2360/45; F01C 21/02; F04D 29/462; F04D 29/49; F04D 29/0563; F04D 29/59
See application file for complete search history.

(56) References Cited

FOREIGN PATENT DOCUMENTS

| | | | | |
|---|---|---|---|---|
| JP | 2002369474 A | * | 12/2002 | ............ F16C 33/303 |
| JP | 2002372051 A | * | 12/2002 | ............ F16C 33/303 |
| JP | 2002372054 A | * | 12/2002 | ............ F16C 33/585 |
| JP | 2006312952 A | * | 11/2006 | ............ F16C 33/768 |
| JP | 2015007451 A | * | 1/2015 | ............ F16C 25/083 |
| KR | 20110112865 A | * | 10/2011 | ............ F16C 25/083 |
| WO | WO-2016194198 A1 | * | 12/2016 | ............ F16C 35/042 |

* cited by examiner

FLUID PUMP FOR A MOTOR VEHICLE

CROSS REFERENCE TO PRIOR APPLICATIONS

This application is a U.S. National Phase application under 35 U.S.C. § 371 of International Application No. PCT/EP2018/064478, filed on Jun. 1, 2018. The International Application was published in English on Dec. 5, 2019 as WO 2019/228644 A1 under PCT Article 21(2).

FIELD

The present invention is directed to a fluid pump for a motor vehicle, for example, to an electrically driven motor vehicle purge pump for pumping fuel vapor out of a motor vehicle fuel tank.

BACKGROUND

A purge pump is not a displacement pump, but is provided with a fast-rotating pump wheel which generates a continuous fluid flow with a relatively high flow rate but with a relatively low pressure. The pump wheel is driven by a driving means which is co-rotatably connected with the pump wheel by a rotor shaft. The rotor shaft supporting the pump wheel and the driving means is rotatably supported by a shaft bearing system.

The shaft bearing system generally comprises two axially spaced ball bearings which provide a stable support of the rotor shaft and which allow for a high-speed rotor shaft rotation. The high-speed rotor shaft rotation causes extensive stress within the ball bearings so that an unbalanced load of the bearing system or a tensioning of the bearing system can cause severe damage within the bearing system. This can reduce the efficiency of the fluid pump or can even cause damage to or failure of the fluid pump. The unbalanced bearing load can be caused, for example, by external vibrations which are transferred into the bearing system. Since the bearing receptacle, the rotor shaft, and the ball bearings are typically made of different materials with different thermal expansion coefficients, and since the pump must withstand ambient temperatures of between 40° C. and 150° C. for automotive applications, temperature-induced expansion of the rotor shaft and/or of the bearings relative to the bearing receptacle can also cause an unbalanced bearing load and/or a disadvantageous tensioning of the bearing system. The temperature-induced expansion is further enhanced by significant heat generation in the ball bearings during the high-speed rotor shaft rotation.

SUMMARY

An aspect of the present invention is to provide a fluid pump for a motor vehicle which provides a high pump performance over a long pump lifetime.

In an embodiment, the present invention provides a fluid pump for a motor vehicle. The fluid pump includes a driving means, a rotor shaft, a pump wheel which is co-rotatably connected with the driving means via the rotor shaft, a shaft bearing system for the rotor shaft, and a preload spring. The shaft bearing system comprises a static bearing receptacle which comprises an axial support flange which is directed radially inwardly, a first floating ball bearing, and a second floating ball bearing. The axial support flange comprises a first axial side and a second axial side which is opposite to the first axial side. The first floating ball bearing and the second floating ball bearing each comprise an outer race, are each fixed to a radial outside of the rotor shaft, and are each configured to be axially shiftable within the static bearing receptacle. The first floating ball bearing is positioned at the first axial side of the axial support flange and the second floating ball bearing is positioned at the second axial side of the axial support flange. The outer race of the first floating ball bearing is in a touching axial contact with the axial support flange. The outer race of the second floating ball bearing is axially preloaded away from the axial support flange via the preload spring. At least one elastic support ring is arranged to radially surround the outer race of each of the first floating ball bearing and the second floating ball bearing. The first floating ball bearing and the second floating ball bearing are each radially supported within the static bearing receptacle only by the at least one elastic support ring.

BRIEF DESCRIPTION OF THE DRAWINGS

The present invention is described in greater detail below on the basis of embodiments and of the drawings in which.

DETAILED DESCRIPTION

The fluid pump according to the present invention is provided with a driving means and with a pump wheel which is co-rotatably connected with the driving means by a rotor shaft. The driving means and the pump wheel are both co-rotatably attached to the rotor shaft so that the pump wheel is driven by the driving means. The driving means and the pump wheel are typically located at opposite axial ends of the rotor shaft. The driving means can, for example, be a turbine wheel, a pulley wheel, or a gear wheel if the pump is mechanically driven, or can alternatively be a motor rotor of an electric motor if the pump is electrically driven.

The fluid pump according to the present invention is also provided with a shaft bearing system for the rotor shaft which comprises a static bearing receptacle and two floating ball bearings. The bearing receptacle can, for example, be provided integrally with a static pump housing or can be provided as a separate arrangement which is statically arranged within the pump housing. The bearing receptacle radially surrounds the rotor shaft and is typically provided with a cylindrical inside contour. The bearing receptacle is provided with a relatively long axial length relative to the axial length of the rotor shaft, for example, the axial length of the bearing receptacle is at least half the axial length of the rotor shaft, to provide a reliable support of the rotor shaft and, in particular, to avoid a tilting of the rotor shaft. The bearing receptacle is provided with a radially inwardly directed axial support flange which protrudes from the radial inside of the bearing receptacle. The support flange is located axially spaced with respect to both axial ends of the bearing receptacle. The radial height of the support flange can, for example, be substantially equal to the radial height of outer races of the ball bearings.

The two ball bearings are both fixed to the radial outside of the rotor shaft, i.e., an inner race of each ball bearing is directly fixed to the rotor shaft. Both ball bearings are provided to be axially shiftable within the bearing receptacle. A first ball bearing is positioned at a first axial side of the support flange and a second ball bearing is positioned at the opposite axial side of the support flange. The ball bearings can, for example, be located at or close to opposite axial ends of the bearing receptacle to provide a stable rotor shaft support. The outer race of the second ball bearing is axially preloaded away from the support flange by a preload spring so that the outer race of the first ball bearing is pushed into touching axial contact with the opposite axial side of the support flange. Both ball bearings are thereby reliably axially supported within the bearing receptacle and are well-defined axially preloaded.

Since both ball bearings are provided to be axially shiftable in the bearing receptacle, the ball bearings and, as a result, the rotor shaft, can axially move with respect to the bearing receptacle and, as a result, with respect to the pump housing. This damps axial vibrations within the bearing system so that a transmission of vibrations from the pump housing via the bearing system into the rotor shaft is avoided or at least minimized. The floating ball bearings also compensate different temperature-induced axial elongations of the rotor shaft and of the bearing receptacle. The axial load of the ball bearings is thereby minimized.

The fluid pump according to the present invention is also provided with elastic support rings, wherein each ball bearing is provided with at least one support ring. The support ring is located between the outer race of the ball bearing and the radial inside of the bearing receptacle and radially surrounds the outer race. The support ring is made of an elastic material, for example, an elastic plastic. The support ring can, for example, be a conventional and cost-efficient O-ring.

According to the present invention, both ball bearings are radially supported within the bearing receptacle only by the support rings. There is a ring gap between the radial outside of the outer race of the ball bearing and the radial inside of the bearing receptacle so that the ball bearings are not in direct radial contact with the bearing receptacle. The elastic support rings provides for vibration damping, in particular a damping of radial vibrations, within the bearing system and thereby minimizes rotor shaft vibrations. Since a gap between the radial outside of the ball bearing and the radial inside of the bearing receptacle exists, the ball bearing can expand in a radial direction without causing tensions or an unbalanced load within the ball bearing.

The fluid pump according to the present invention is provided with a shaft bearing system which minimizes rotor shaft vibrations and which can compensate and tolerate temperature-induced expansions of the rotor shaft and/or of the ball bearings with respect to the bearing receptacle. This minimizes the mechanical load and, as a result, the wear of the bearing system so that the fluid pump according to the present invention provides for a high pump performance over a long pump lifetime.

In an embodiment of the present invention, the outer races of both ball bearings can, for example, each be provided with at least one positioning ring groove which receives the support ring. The positioning ring grooves reliably supports and positions the support rings in an axial direction. The positioning grooves in particular avoids that the support rings slip out of the gap between the ball bearing and the bearing receptacle if the bearing is moved axially.

The bearing receptacle is alternatively or additionally provided with positioning ring grooves which receive the support rings. The bearing receptacle is provided with at least two positioning grooves, i.e., at least one position groove for each ball bearing. The positioning grooves are positioned so that at least one positioning groove is located within the axial extent of each ball bearing.

Each ball bearing can, for example, be provided with exactly two axially spaced support rings. The two support rings can, for example, be spaced as far away from each other as possible so that one support ring is located close to a first axial end of the outer race of the ball bearing and the second support ring is located close to the opposite second axial end of the outer race. The two axially spaced support rings provide a stable radial support of the ball bearing within the bearing receptacle and in particular avoid a tilting of the ball bearing. The two support rings nevertheless provide only a relatively small contact area so that the ball bearings can be axially moved within the bearing receptacle without generating significant friction and, as a result, without generating a significant axial bearing load.

In an embodiment of the present invention, the shaft bearing system can, for example, be arranged axially between the driving means and the pump wheel. The center of mass of the complete rotor arrangement, which includes the rotor shaft, the pump wheel, and the driving means, is thus located within the bearing system so that the bearing system must withstand only relatively low leverage forces.

The driving means can, for example, be a motor rotor of an electric motor so that the fluid pump is electrically driven by the electric motor. The electric motor, and thereby the fluid pump, can thus be very exactly controlled. The electric motor also allows for a control of the fluid pump independent of a motor vehicle engine without complex mechanical arrangements.

In an embodiment of the present invention, the fluid pump can, for example, be a gas pump and, in particular, a purge pump for pumping fuel vapor out of a motor vehicle fuel tank.

It is generally favorable to fix the ball bearings to the rotor to provide for an easy assembly of the fluid pump. In some circumstances, however, the fluid pump can, for example, be provided with an inverse kinematic concept. The ball bearings are here both fixed to the radial inside of the bearing receptacle and are provided to be axially shiftable with respect to the rotor shaft so that the axial support flange is provided at the radial outside of the rotor shaft. Both ball bearings are each fixed with their outer race to the radial inside of the bearing receptacle. The inner race of the first ball bearing is in touching axial contact with the axial support flange. The inner race of the second ball bearing is axially preloaded away from the support flange by the preload spring. The elastic support rings are provided at the radial inside of each ball bearing and are located radially between the inner race of the ball bearing and the radial outside of the rotor shaft. This fluid pump also minimizes rotor shaft vibrations and allows compensating and tolerating temperature-induced expansions of the rotor shaft and/or of the ball bearings with respect to the bearing receptacle.

Embodiments of the present invention are described below under reference to the enclosed drawings.

Figure 1:
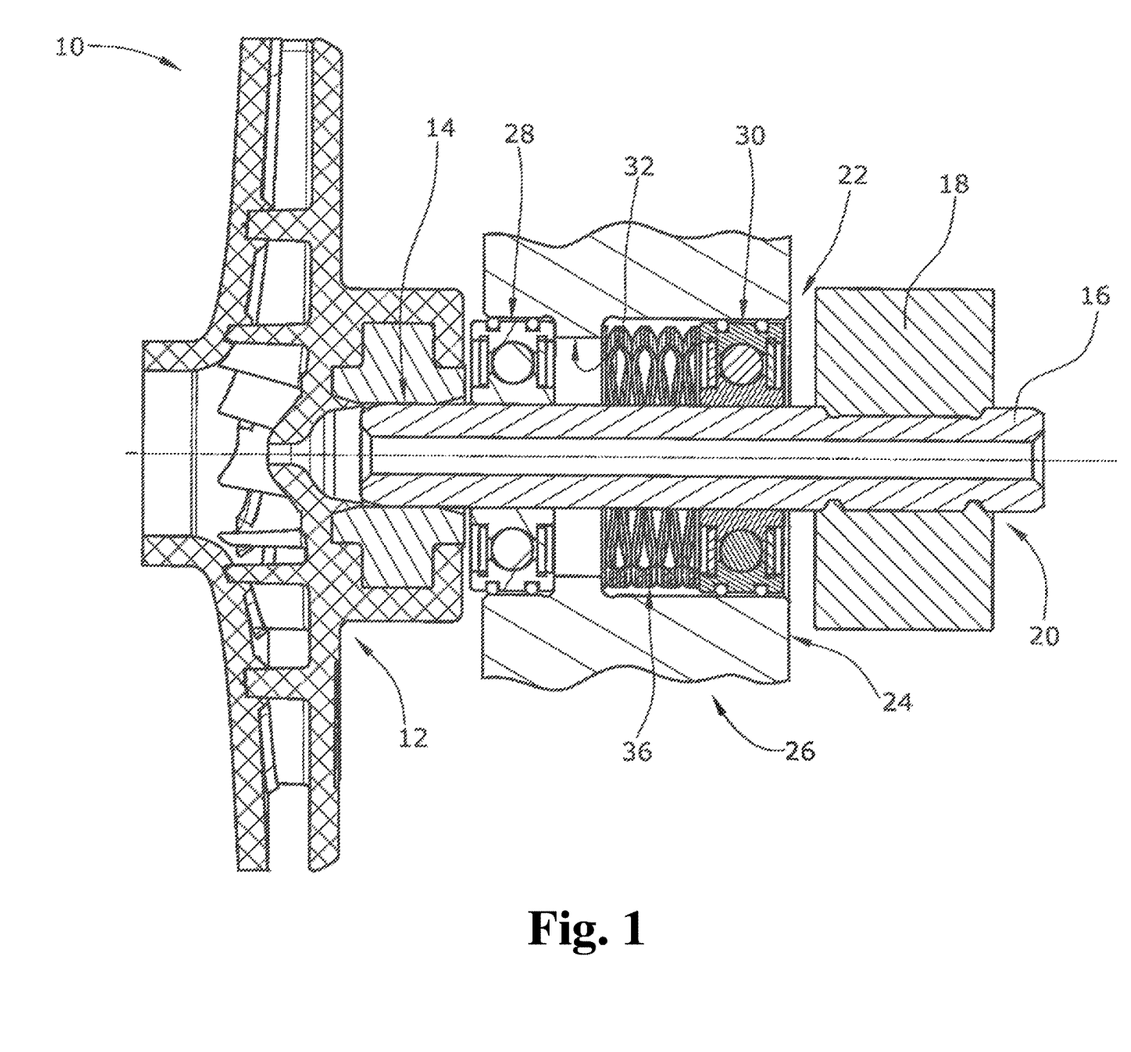
FIG. 1 shows a longitudinal section of a fluid pump according to the present invention.

FIG. 1 shows a fluid pump 10 which in the embodiment of the present invention is a purge pump for pumping fuel vapor out of a motor vehicle fuel system (which is not shown in the drawings).

The fluid pump 10 is provided with a pump wheel 12 which is co-rotatably attached to a first proximal axial end 14 of a rotor shaft 16 and with a driving means 18 which is directly fixed to a second distal axial end 20 of the rotor shaft 16. The rotor shaft 16 extends substantially in an axial pump direction. In the shown embodiment of the present invention, the driving means 18 is a magnetic motor rotor of an electric motor (which is not shown in the drawings).

The rotor shaft 16 and, as a result, the pump wheel 12 and the driving means 18 being attached to the rotor shaft 16 are axially and radially supported within a pump housing 26 by a shaft bearing system 22. The shaft bearing system 22 comprises a static bearing receptacle 24 which, in the shown embodiment of the present invention, is provided integrally with the static pump housing 26. The shaft bearing system 22 also comprises a first ball bearing 28 and a second ball bearing 30 which are arranged radially and axially within the bearing receptacle 24. The bearing receptacle 24 is provided with a radially inwardly directed axial support flange 32. The first ball bearing 28 is located at a first proximal axial side of the axial support flange 32, and the second ball bearing 30 is located at an opposite second distal axial side of the axial support flange 32.

Figure 2:
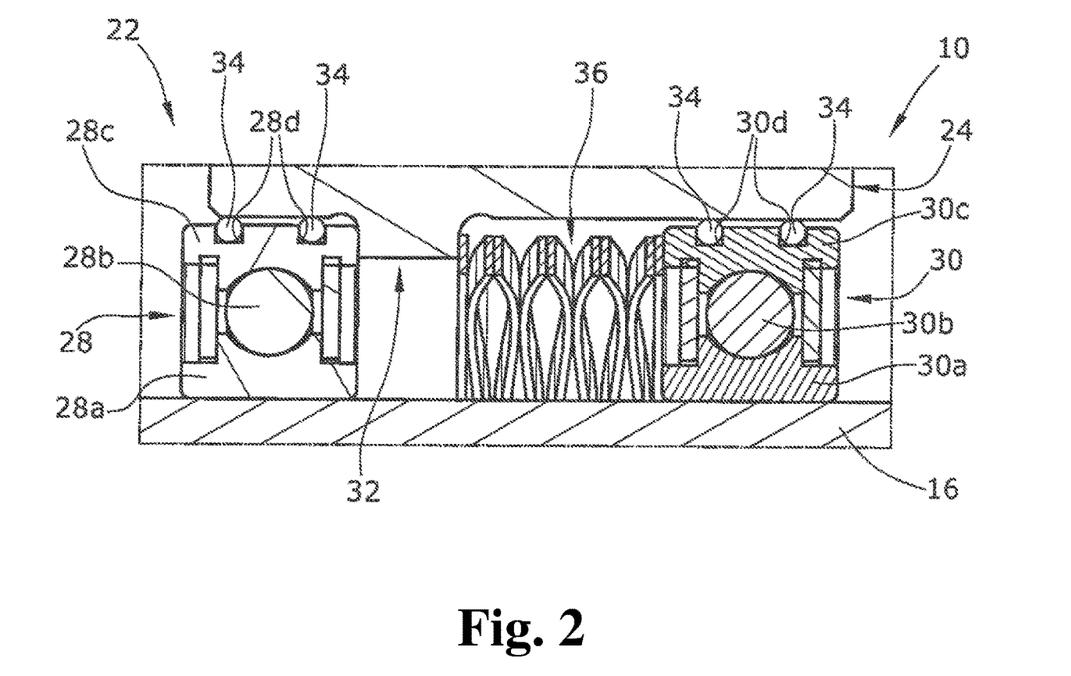
FIG. 2 shows an enlarged section of a shaft bearing system of the fluid pump of FIG. 1, wherein outer races of ball bearings are provided with positioning grooves.

FIG. 2 shows that both the first ball bearing 28 and the second ball bearing 30 are each provided with an inner race 28a,30a, several bearing balls 28b,30b, and an outer race 28c,30c. The inner race 28a,30a of each the first ball bearing 28 and the second ball bearing 30 is fixed to the radial outside of the rotor shaft 16. The outer race 28c,30c of each of the first ball bearing 28 and the second ball bearing 30 is provided with two axially-spaced positioning ring grooves 28d,30d which each receive an elastic support ring 34. The axially-spaced positioning ring grooves 28d,30d reliably axially support and position the elastic support rings 34 within the shaft bearing system 22. The elastic support rings 34 are conventional O-rings in the shown embodiment of the present invention.

Both the first ball bearing 28 and the second ball bearing 30 and, in particular, their outer races 28c,30c, are each radially supported within the bearing receptacle 24 only by the elastic support rings 34, i.e., the outer races 28c,30c are not in direct radial contact with the radial inside of the bearing receptacle 24. The outer race 30c of the second ball bearing 30 is axially preloaded away from the axial support flange 32 by a preload spring 36. The preload spring 36 is in touching contact with the distal axial side of the axial support flange 32 and pushes the outer race 30c away from the axial support flange 32 in the distal axial pump direction. The outer race 28c of the first ball bearing 28 is as a result axially pushed against the axial support flange 32 so that the outer race 28c is in touching axial contact with the proximal axial side of the axial support flange 32. As a result, both the first ball bearing 28 and the second ball bearing 30 are reliably axially supported and are well-defined axially preloaded so that the rotor shaft 16 and, as a result, the pump wheel 12 and the driving means 18, are reliably supported and positioned within the pump housing 26.

Both the first ball bearing 28 and the second ball bearing 30 are nevertheless axially shiftable with respect to the bearing receptacle 24 because their outer races 28c,30c are not fixed to the bearings receptacle 24. This provides for a compensation of the axial vibrations of the pump housing 26 and provides for a compensation of different temperature-induced axial expansions of the rotor shaft 16 relative to the bearing receptacle 24 without generating significant axial loads within the ball bearings 28,30. Since the first ball bearing 28 and the second ball bearing 30 are radially supported only by the elastic support rings 34, the shaft bearing system 22 can also compensate for radial vibrations of the pump housing and can compensate for different temperature-induced radial extensions of the rotor shaft 16 and/or the first ball bearing 28 and the second ball bearing 30 relative to the bearing receptacle 24.

Figure 3:
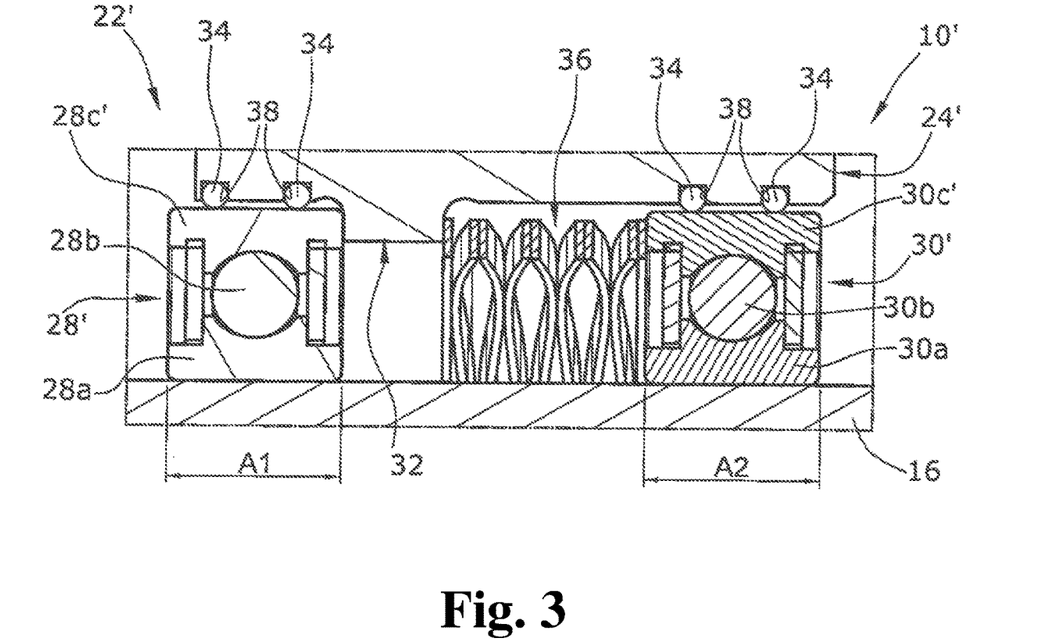
FIG. 3 shows an enlarged section of a first alternative shaft bearing system of the fluid pump of FIG. 1, wherein a bearing receptacle is provided with positioning grooves.

FIG. 3 shows an alternative shaft bearing system 22', wherein the radial inside of the bearing receptacle 24' is provided with four axially-spaced positioning ring grooves 38 which each receive an elastic support ring 34. The positioning ring grooves 38 are positioned within the bearing receptacle 24' so that two positioning ring grooves 38 are located within the radial extent A1 of the first ball bearing 28', and two positioning ring grooves 38 are located within the radial extent A2 of the second ball bearing 30'. The positioning ring grooves 38 reliably axially support and position the elastic support rings 34 within the shaft bearing system 22'.

Figure 4:
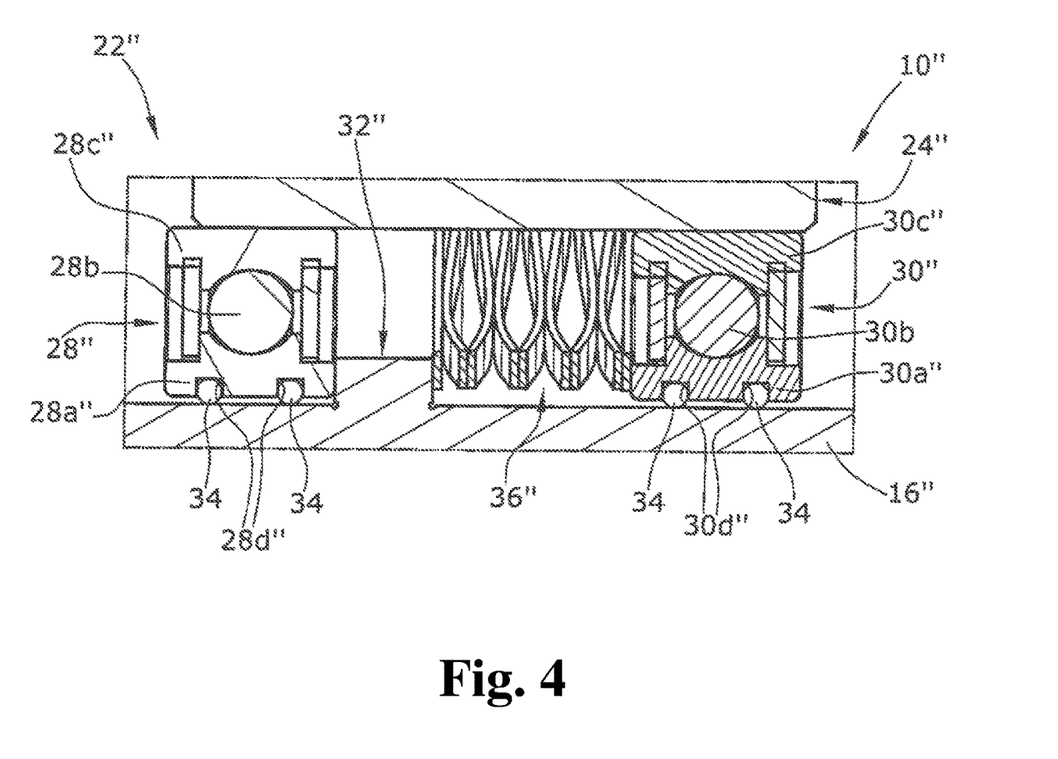
FIG. 4 shows an enlarged section of a second alternative shaft bearing system of the fluid pump of FIG. 1 with an inverse kinematic concept.

FIG. 4 shows another alternative shaft bearing system 22" with an inverse kinematic concept. The first ball bearing 28" and the second ball bearing 30" are both fixed at the radial inside of the bearing receptacle 24" and are both provided axially shiftable with respect to the rotor shaft 16". The axial support flange 32" is provided at the radial outside of the rotor shaft 16" and extends radially outwardly. The inner races 28a",30a" of both the first ball bearing 28" and the second ball bearing 30" are each provided with two axially-spaced positioning ring grooves 28d",30d" which each receive an elastic support ring 34. Both the first ball bearing 28" and the second ball bearing 30" are radially supported at the rotor shaft 16" only by the elastic support rings 34. The inner race 30a" of the second ball bearing 30" is axially preloaded away from the axial support flange 32" by a preload spring 36" so that the inner race 28a" of the first ball bearing 28" is axially pushed against the axial support flange 32".

The present invention is not limited to embodiments described herein; reference should be had to the appended claims.

LIST OF REFERENCE NUMERALS

10;10';10" fluid pump
12 pump wheel
14 first proximal axial end (of rotor shaft)
16;16" rotor shaft
18 driving means
20 second distal axial end (of rotor shaft)
22;22';22" shaft bearing system
24;24';24" bearing receptacle
26 pump housing
28;28',28" first ball bearing
28a,28a" inner race
28b bearing balls
28c;28c',28c" outer race
28d,28d" axially-spaced positioning grooves
30;30',30" second ball bearing
30a,30a" inner race
30b bearing balls
30c,30c',30c" outer race
30d,30d" axially-spaced positioning grooves
32;32" axial support flange
34 elastic support rings
36;36" preload spring
38 positioning ring grooves
A1,A2 radial extents

What is claimed is:

1. A fluid pump for a motor vehicle, the fluid pump comprising:
   a driving means;
   a rotor shaft;
   a pump wheel which is co-rotatably connected with the driving means via the rotor shaft;
   a shaft bearing system for the rotor shaft, the shaft bearing system comprising,
      a static bearing receptacle which comprises,
         an axial support flange which is directed radially inwardly, the axial support flange comprising a first axial side and a second axial side which is opposite to the first axial side, and
         a first floating ball bearing and a second floating ball bearing each of which,
         comprise an outer race,
         are fixed to a radial outside of the rotor shaft, and
         are configured to be axially shiftable within the static bearing receptacle; and
   a preload spring,
   wherein,
   the first floating ball bearing is positioned at the first axial side of the axial support flange and the second floating ball bearing is positioned at the second axial side of the axial support flange,
   the outer race of the first floating ball bearing is in a touching axial contact with the axial support flange,
   the outer race of the second floating ball bearing is axially preloaded away from the axial support flange via the preload spring,
   at least one elastic support ring is arranged to radially surround the outer race of each of the first floating ball bearing and the second floating ball bearing, and
   the first floating ball bearing and the second floating ball bearing are each radially supported within the static bearing receptacle only by the at least one elastic support ring.

2. The fluid pump as recited in claim 1, wherein the outer race of the first floating ball bearing and the outer race of the second floating ball bearing each comprise at least one positioning groove which is configured to receive the at least one elastic support ring.

3. The fluid pump as recited in claim 1, wherein,
   the static bearing receptacle further comprises at least two positioning grooves,
   at least one of the at least two positioning grooves is arranged within an axial extent of each of the first floating ball bearing and the second floating ball bearing, and
   each of the at least two positioning grooves is configured to receive the at least one elastic support ring.

4. The fluid pump as recited in claim 1, wherein,
   each of the first floating ball bearing and the second floating ball bearing comprises exactly two of the at least one elastic support ring, and
   the exactly two of the at least one elastic support ring are arranged axially spaced with respect to each other.

5. The fluid pump as recited in claim 1, wherein the shaft bearing system is arranged axially between the driving means and the pump wheel.

6. The fluid pump as recited in claim 1, wherein the driving means is a motor rotor of an electric motor.

7. The fluid pump as recited in claim 1, wherein the fluid pump is a gas pump.

8. The fluid pump as recited in claim 7, wherein the gas pump is a purge pump for pumping fuel vapor out of a motor vehicle fuel system.

9. A fluid pump for a motor vehicle, the fluid pump comprising:
   a driving means;
   a rotor shaft comprising an axial support flange which is directed radially inwardly, the axial support flange comprising a first axial side and a second axial side which is opposite to the first axial side;
   a pump wheel which is co-rotatably connected with the driving means via the rotor shaft;
   a shaft bearing system for the rotor shaft, the shaft bearing system comprising,
      a static bearing receptacle, and
      a first floating ball bearing and a second floating ball bearing each of which,
         comprise an inner race,
         are fixed to a radial inside of the static bearing receptacle, and
         are configured to be axially shiftable with respect to the rotor shaft; and
   a preload spring,
   wherein,
   the first floating ball bearing is positioned at the first axial side of the axial support flange and the second floating ball bearing is positioned at the second axial side of the axial support flange,
   the inner race of the first floating ball bearing is in a touching axial contact with the axial support flange,
   the inner race of the second floating ball bearing is axially preloaded away from the axial support flange via the preload spring,
   at least one elastic support ring is arranged to be radially surrounded by the inner race of each of the first floating ball bearing and the second floating ball bearing, and
   the first floating ball bearing and the second floating ball bearing are each radially supported at the rotor shaft only by the at least one elastic support ring.

10. The fluid pump as recited in claim 9, wherein the inner race of the first floating ball bearing and the inner race of the second floating ball bearing each comprise at least one positioning groove which is configured to receive the at least one elastic support ring.

11. The fluid pump as recited in claim 9, wherein,
   the rotor shaft further comprises at least two positioning grooves,
   at least one of the at least two positioning grooves is arranged within an axial extent of each of the first floating ball bearing and the second floating ball bearing, and
   each of the at least two positioning grooves is configured to receive the at least one elastic support ring.

12. The fluid pump as recited in claim 9, wherein,
   each of the first floating ball bearing and the second floating ball bearing comprises exactly two of the at least one elastic support ring, and
   the exactly two of the at least one elastic support ring are arranged axially spaced with respect to each other.

13. The fluid pump as recited in claim 9, wherein the shaft bearing system is arranged axially between the driving means and the pump wheel.

14. The fluid pump as recited in claim 9, wherein the driving means is a motor rotor of an electric motor.

15. The fluid pump as recited in claim 9, wherein the fluid pump is a gas pump.

16. The fluid pump as recited in claim 15, wherein the gas pump is a purge pump for pumping fuel vapor out of a motor vehicle fuel system.

\* \* \* \* \*